Patented Jan. 14, 1947

2,414,380

UNITED STATES PATENT OFFICE 2,414,380

POLYMERIZATION OF OLEFINIC HYDROCARBONS

Carl B. Linn, Riverside, Ill., assignor to Universal Oil Products Company, Chicago, Ill., a corporation of Delaware No Drawing. Application March 31, 1945, Serial No. 586,018

8 Claims. (Cl. 260—683.15)

This application is a continuation-in-part of my copending application Serial No. 424,784, filed December 29, 1941, now Patent Number 2,398,905, granted April 23, 1946, and of my copending application Serial No. 502,664, filed September 16, 1943, now Patent Number 2,406,086, granted August 20, 1946.

This invention relates to the polymerization of olefinic hydrocarbons in the presence of a special type of catalyst. More particularly, this invention relates to the polymerization of propylene and butylenes into normally liquid hydrocarbons boiling within the approximate range of gasoline.

An object of this invention is to polymerize olefinic hydrocarbons in the presence of a liquid catalytic material.

Another object of this invention is to convert propylene and butylenes into normally liquid hydrocarbons in the presence of a liquid catalyst.

One specific embodiment of this invention relates to a process which comprises reacting an olefinic hydrocarbon having at least 3 carbon atoms per molecule at polymerizing conditions in the presence of a mixture of hydrogen fluoride and hydrogen cyanide.

Another embodiment of this invention relates to a polymerization process which comprises reacting a normally gaseous olefin containing at least 3 carbon atoms per molecule at polymerizing conditions in the presence of hydrogen fluoride and hydrogen cyanide.

Normally gaseous and liquid olefinic hydrocarbons which are polymerizable by the process of the present invention occur together with paraffinic or saturated hydrocarbons in commercial hydrocarbon mixtures such as those encountered in the cracking of petroleum, in gas making processes, and as by-products of various chemical industries. Suitable olefins, such as propylene, butylenes, amylenes, hexenes, etc., may be obtained also by catalytic dehydrogenation of paraffins, by pyrolysis of certain paraffinic hydrocarbons, and by dehydration of alcohols.

In general, olefins have a relatively high activity and even under mild catalytic influence they exhibit this activity by their pronounced tendency to polymerize and form substances of higher molecular weights. This process is particularly effective for converting propylene and butylenes into normally liquid polymers.

The present process is directed particularly to the production of polymers containing from about 6 to about 12 carbon atoms per molecule from propylene and butylenes. The preferred polymer products boil at temperatures within the approximate boiling range of commercial gasoline. These polymers containing from about 6 to about 12 carbon atoms per molecule are useful for blending with straight-run gasoline to increase its antiknock value.

By the addition of hydrogen cyanide to liquid hydrogen fluoride, the ordinarily vigorous reaction of hydrogen fluoride on catalytic condensation reactions among hydrocarbons is moderated. Thus I have found that substantial yields of liquid polymers of relatively low molecular weights are produced when propylene and butylenes are reacted at a temperature of from about —30° to about +130° C., but preferably at a temperature of from about 20° to about 100° C. in the presence of a catalyst comprising essentially a major proportion of hydrogen fluoride and a minor proportion of hydrogen cyanide. Such polymerization treatment is generally carried out at a pressure sufficient to maintain the reacting hydrocarbons and catalyst in substantially liquid phase. Accordingly, the present invention deals with the modification of a hydrogen fluoride polymerization catalyst by the addition thereto of a particular non-oxidizing acid which moderates the action of hydrogen fluoride and modifies the polymerization reaction in such a way as to improve the yield and quality of relatively low boiling but normally liquid products.

Hydrogen cyanide is a weak volatile acid and like hydrogen fluoride it is a liquid at ordinary temperatures and at atmospheric or moderate superatmospheric pressures. Hydrogen cyanide has a boiling point of 26.5° C. and hydrogen fluoride boils at 19.4° C. The melting points of hydrogen cyanide and hydrogen fluoride are —13.4° C. and —92.3° C., respectively. Hydrogen cyanide is soluble in water, alcohol, and ether, and also in hydrogen fluoride at the conditions of reaction in the concentrations which are contemplated in the present process. Ordinarily the catalyst employed in my invention may comprise from about 0.5 to about 10% by weight of hydrogen cyanide. Because of its toxicity and attendant difficulties when employed in high concentrations it is generally desirable to maintain the hydrogen cyanide content of the catalyst below about 5% by weight.

My polymerization process may be carried out in a batch operation but preferably in continuous type of operation. In batch type treatment an olefinic hydrocarbon or a hydrocarbon fraction containing olefins may be agitated with a mixture of hydrogen fluoride and hydrogen cyanide in an autoclave or other reactor of suitable design. It is usually necessary to include a cooling zone or other heat exchange means in the polymerization zone or between such zones if a multiple polymerization reactor system is employed.

Continuous operation of my process may be carried out by passing a mixture of an olefin-containing hydrocarbon fraction and a mixture of hydrogen fluoride and hydrogen cyanide through a suitable reactor, separating liquid polymers from unconverted olefins and catalyst mixture and recycling the unconverted olefins and catalyst mixture to the polymerization zone of the process.

The following example is given to indicate results obtainable by the present process, although it is not intended to limit the scope of the invention in exact correspondence with the example.

A mixture of 143 grams of substantially anhydrous hydrogen fluoride and 5 grams of hydrogen cyanide is placed in an autoclave of approximately 2000 cc. capacity equipped with a pressure-sealed stirring device. The autoclave is maintained at approximately 75° C. while 1000 cc. of a liquid containing 2 molecular proportions of normal butane and 1 molecular proportion of normal butylene is introduced continuously to the autoclave over a period of 1.5 hours.

The resultant mixture of reaction products is separated into a hydrocarbon polymer layer and a heavier catalyst layer. The used catalyst is returned to the autoclave for use in another polymerization run, while the hydrocarbon polymer layer is washed with water and alkali and then dried and fractionally distilled to separate a hydrocarbon fraction of gasoline boiling range containing a substantial proportion of branched chain octenes and polymers of higher molecular weights containing up to about 12 carbon atoms per molecule.

I claim as my invention:

1. A polymerization process which comprises reacting an olefinic hydrocarbon having at least 3 carbon atoms per molecule in the presence of a liquid hydrogen fluoride catalyst to which has been added a minor proportion of hydrogen cyanide.

2. A process for synthesizing olefinic hydrocarbons of gasoline boiling range which comprises polymerizing a normally gaseous olefin having at least 3 carbon atoms per molecule in the presence of a catalyst comprising a major proportion by weight of liquid hydrogen fluoride and a minor proportion of hydrogen cyanide.

3. A polymerization process which comprises contacting an olefinic hydrocarbon having at least 3 carbon atoms per molecule at a temperature of from about $-30°$ to about $+130°$ C. in the presence of a catalyst comprising essentially a major proportion by weight of liquid hydrogen fluoride and a minor proportion of hydrogen cyanide.

4. A polymerization process which comprises contacting an olefinic hydrocarbon having at least 3 carbon atoms per molecule at a temperature of from about 20° to about 100° C. in the presence of a catalyst comprising essentially a major proportion by weight of liquid hydrogen fluoride and a minor proportion of hydrogen cyanide.

5. A polymerization process which comprises reacting propylene at a temperature of from about 20° to about 100° C. in the presence of a liquid hydrogen fluoride catalyst containing a minor proportion of hydrogen cyanide.

6. A polymerization process which comprises reacting butylene at a temperature of from about 20° to about 100° C. in the presence of a liquid hydrogen fluoride catalyst containing a minor proportion of hydrogen cyanide.

7. A polymerization process which comprises reacting propylene and butylene at a temperature of from about 20° to about 100° C. in the presence of a liquid hydrogen fluoride catalyst containing a minor proportion of hydrogen cyanide.

8. A polymerization process which comprises contacting an olefinic hydrocarbon having at least 3 carbon atoms per molecule at a temperature of from about 20° to about 100° C. and at a pressure sufficient to maintain in liquid phase a substantial proportion of the reacting olefinic hydrocarbon and catalyst in the presence of a catalyst comprising essentially a major proportion by weight of liquid hydrogen fluoride and a minor proportion of hydrogen cyanide.

CARL B. LINN.